Sept. 19, 1961      J. STUART III      3,000,445
HELICOPTER TORQUE CONTROL DEVICE
Filed Sept. 14, 1959
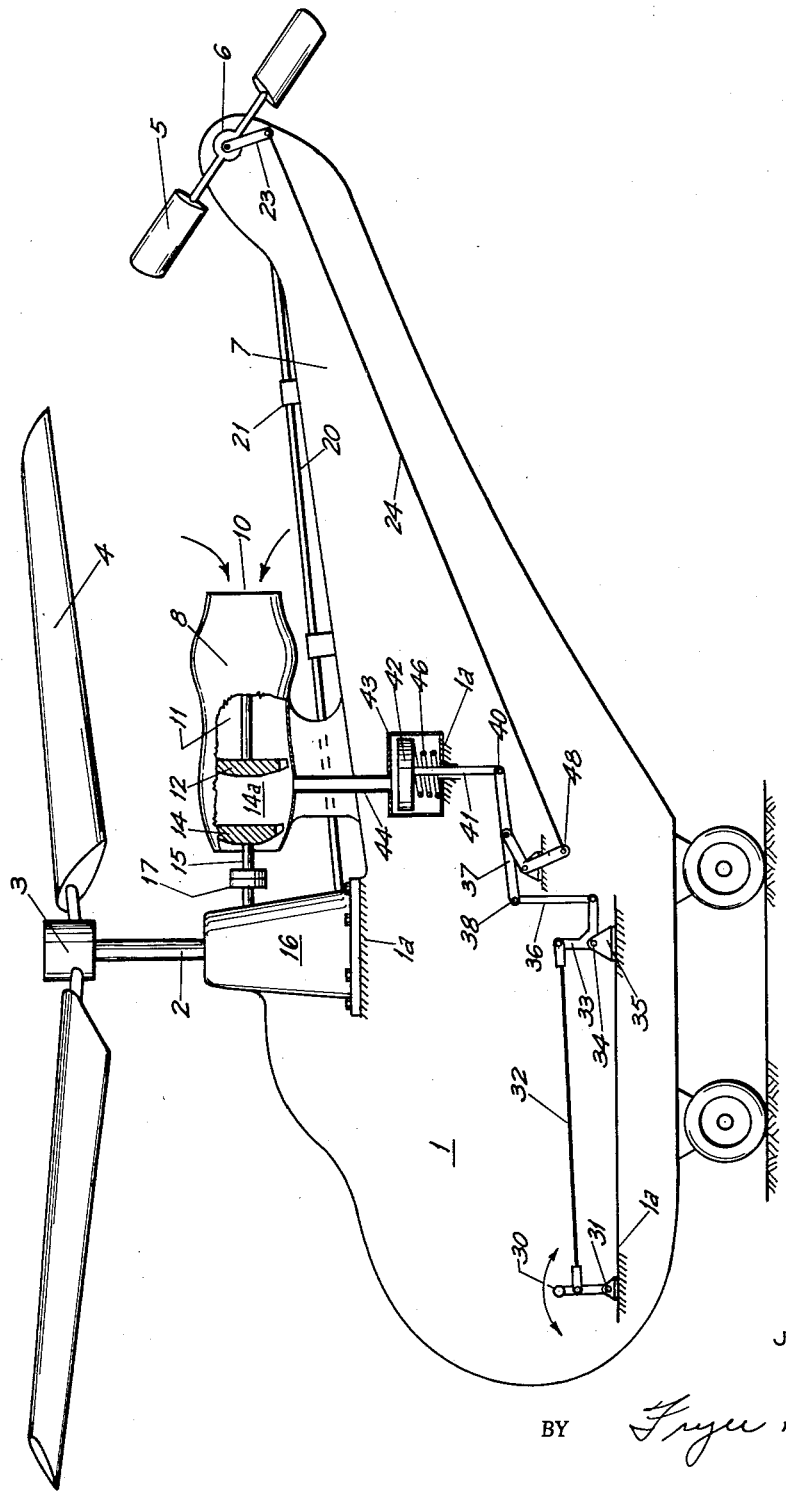
INVENTOR
JOSEPH STUART III
BY *Fryer + Johnson*
ATTORNEYS – # United States Patent Office 3,000,445
HELICOPTER TORQUE CONTROL DEVICE
Joseph Stuart III, Palo Alto, Calif., assignor, by mesne assignments, to Hiller Aircraft Corp., Palo Alto, Calif., a corporation of California
Filed Sept. 14, 1959, Ser. No. 839,782
3 Claims. (Cl. 170—135.22)

This invention relates to a helicopter torque control device and, more particularly, to a device for adjusting thrust of the conventional anti-torque tail rotor in accordance with the actual rotor shaft torque, while permitting simultaneous pilot control for maneuvering.

In most single rotor helicopters a small tail rotor is located at the end of the tail boom to compensate for main rotor torque and to contribute to directional control of the helicopter. Since the main rotor torque is not constant, the pilot is required to devote considerable attention to manipulation of the foot pedals continuously to compensate and counter the variable differential in torque produced between the main and tail rotors. Moreover, since the total travel of the foot pedals is restricted by practical limitations, and since the magnitude of the directional control moment is fixed at a high value by the requirement that the tail rotor must be able to counter main rotor driving torque, an extremely sensitive control results, particularly in small helicopters.

It is, therefore, an object of this invention to provide means for minimizing the sensitivity of the foot pedals for directional heading control while automatically compensating for main rotor torque.

It is a further object of this invention to provide a means for controlling the torque compensating thrust of the tail rotor automatically in proportion to the actual main rotor torque.

It is a further object of this invention to provide automatic means for adjusting thrust of the tail rotor to compensate for torque, leaving full operation of the pilot controls for yaw control.

It is a further object of this invention to provide automatic torque compensating means operative in response to actual torque imposed on the rotor mast without regard to engine performance or failure.

It is a further object of this invention to provide an integrated drive and control means for the main and tail rotors that is simple and reliable in operation.

A rotary wing aircraft embodying features of this invention would include a turbine engine mechanically connected to the main drive shaft or mast, and driven by some fluid medium, such as combustion gases. Prior to acting upon the last stages of a turbine engine, or upon the free turbine in the case of a free output turbine engine, the fluid medium is of a pressure in excess of ambient pressure, the value of this pressure difference being indicative of the amount of torque applied to the main rotor. The value of this pressure difference, and hence the amount of rotor torque, can be represented by the displacement of a biased piston against which the pressure is asserted. The piston is connected to an adding linkage which is also connected to the foot pedal controls so that pilot manipulation may be superimposed upon torque related piston movement in the adjustment of the tail rotor collective pitch.

Other objects and advantages of this invention will become apparent from the specification following when read in connection with the accompanying drawing wherein:

The figure is a schematic illustration of a helicopter embodying features of this invention.

Referring now to the drawing in particular there is shown in more or less schematic outline form a helicopter including a fuselage 1 on which is rotatably mounted the main mast or drive shaft 2 supporting a hub 3 for rotating the main rotor blades 4. Also on the fuselage 1 is a tail rotor 5 rotatable on shaft 6 journalled in the tail boom 7. A turbine engine 8 delivers the power to both the main rotor 4 and the tail rotor 5 and includes a gas producer section 11 with intake end 10 and a turbine 12. A free output turbine 14 impelled by the gas medium discharged from the gas producer section 11 drives a shaft 15 which delivers engine output to a gear box 16 for driving the main rotor 4. As pressure above ambient in the free turbine chamber 14a of the turbine impelling gas increases, torque on the main shaft increases correspondingly. A conventional free wheeling unit 17 is preferably interposed in the shaft 15.

The tail rotor 5 is driven with the main rotor by means of a conventional tail rotor drive shaft 20 rotatably carried in bearings 21 supported on the tail boom 7. It is desirable to have the thrust of the tail rotor vary in accordance with changing requirements imposed by variations in torque and, toward that end, a conventional mechanism shown generally at 23 is provided to change the collective pitch of the tail rotor 5 in response to movement of a rod or push pull cable 24. Of course, any suitable motion transmitting member may be substituted and the rod or cable 24 is shown merely for purposes of illustration. As in conventional helicopters, the tail rotor collective pitch control means 23 is operated in response to pilot control, as for example, by manipulation of foot pedals 30 pivotally mounted at 31 about the aircraft frame 1a. A rod or similar force transmitting member 32 pivots a bell crank lever 33 about pin 34 mounted in bracket 35 on the frame 1a. A link 36 pivotally connected to a thrust control adding link 37 at pivot point 38 is provided to translate rocking of the bell crank into oscillation of the adding link 37.

At the other end 40 of the adding link 37 is pivotally connected a piston rod 41 carried by a piston 42 in cylinder 43. A conduit 44 opening into the free turbine chamber 14a brings the fluid medium into communication with the cylinder 43 above the piston 42 and tends to drive it downwardly in opposition to the coil spring 46. Thus, reciprocation of the piston rod 42 tends to pivot the adding link 37 about pivot point 38 on the pilot control transmission link 36 and reciprocation of the pilot control link 36 tends to pivot the adding link 37 about pivot point 40 on the piston rod 41. Either action will produce transverse movement of the adding link 37 which, through any suitable means, such as bell crank 48 may be translated into movement of the cable 24 to change collective pitch of the tail rotor 5.

Thus, when engine power is varied to adjust or restore operating rotor speed, the collective pitch is changed by displacement of the piston 42 in direct response to torque variation manifested by an increase in pressure above ambient in the free turbine chamber 14a without affecting the pedal movement which may still be employed throughout its full range to operate the pitch control means 23 separately or concurrently. The means for transmitting motion to the linkage 37, 48 for controlling the tail rotor pitch in relation to rotor shaft torque is shown simply as a spring-opposed piston 42, but it is to be understood that any means, mechanical or otherwise, may be substituted to transmit such motion linearly or non-linearly, according to the measured correlation of the gas pressure in chamber 14a and the rotor shaft torque. Moreover, though a free output turbine has been shown, a similar usable relationship of pressure and torque will apply to a fixed shaft turbine, particularly in the later stages thereof.

It is to be understood that there is here illustrated and generally described a typical structure by which the objects may be accomplished, and it is apparent that other modifications and changes thereto can be made without departing from the spirit and scope of this invention which is to be defined and limited only by the claims appended hereto.

What is claimed as invention is:

1. The combination in a rotary wing aircraft of a main lift rotor, a tail rotor, a gas driven turbine engine having a gas chamber therein, said engine being operatively connected with said lift rotor and said tail rotor for driving said rotors, and means operatively connected between said tail rotor and said engine in cummunication with the gas chamber thereof for automatically increasing or decreasing the pitch or said tail rotor in accordance with an increase or decrease in the pressure of the turbine gas in said gas chamber, whereby an increase in torque compensating thrust may be automatcially imparted to said tail rotor by increasing the pitch thereof upon increased power being supplied to said lift rotor by said turbine engine, and vice versa; said means comprising a member responsive to gas pressure, a conduit extending from said engine gas chamber through which gas from said chamber may flow against said member, said member being movable in response to variance in the pressure of engine gas passing through said conduit from said engine gas chamber, and mechanism operatively connected between said member and said tail rotor for modifying the pitch of said tail rotor in response to movement of said member as a result of increased or decreased gas pressure in said gas chamber of said turbine engine.

2. The combination in a rotary wing aircraft of a main lift rotor, a tail rotor, a gas driven free turbine engine having a gas chamber therein, said free turbine engine being operatively connected with said lift rotor and said tail rotor for driving said rotors, and means operatively connected between said tail rotor and said free turbine engine in communication with the gas chamber thereof for automatically increasing or decreasing the pitch of said tail rotor in accordance with an increase or decrease in the pressure of the turbine gas in said gas chamber, whereby an increase in torque compensating thrust may be automatically imparted to said tail rotor by increasing the pitch thereof upon increased power being supplied to said lift rotor by said free turbine engine, and vice versa; said means comprising a cylinder, a conduit extending from said engine gas chamber to said cylinder through which gas from said chamber may flow into said cylinder, a gas pressure responsive piston in said cylinder and slidably movable therein in direct response to variance in the pressure of engine gas entering said cylinder through said conduit from said engine gas chamber, spring means in said cylinder normally urging said piston toward an end of said cylinder against the effects of the pressure of gas entering said cylinder, and mechanism operatively connected between said piston and said tail rotor for modifying the pitch thereof in response to movement of said piston relative to said cylinder as a result of increased or decreased gas pressure in said gas chamber of said free turbine engine; said mechanism comprising a linkage between said piston and said tail rotor which is movable in response to movement of said piston to modify the pitch of said tail rotor.

3. The combination in a rotary wing aircraft of a main lift rotor, a tail rotor, a gas driven free turbine engine having a gas chamber therein, said free turbine engine being operatively connected with said lift rotor and said tail rotor for driving said rotors, means operable by the pilot of said aircraft for selectively increasing or decreasing the pitch of said tail rotor, and other means operatively connected between said tail rotor and said turbine engine in communication with the gas chamber thereof for automatically increasing or decreasing the pitch of said tail rotor in accordance with an increase or decrease in the pressure of the turbine gas in said gas chamber, whereby an increase in torque compensating thrust may be automatically imparted to said tail rotor by increasing the pitch thereof upon increased power being supplied to said lift rotor by said free turbine engine, and vice versa; said other means comprising a cylinder, a conduit extending from said engine gas chamber to said cylinder through which gas from said chamber may flow into said cylinder, a gas pressure responsive piston in said cylinder and slidably movable therein in direct response to variance in the pressure of engine gas entering said cylinder through said conduit from said engine gas chamber, and mechanism operatively connected between said piston and said tail rotor for modifying the pitch of said tail rotor in response to movement of said piston relative to said cylinder as a result of increased or decreased gas pressure in said gas chamber of said free turbine engine; said pilot operable means being superimposable on said other means whereby the aircraft pilot may modify said tail rotor pitch for directional control of said aircraft irrespective of the pressure of the gas in said turbine gas chamber.

References Cited in the file of this patent

UNITED STATES PATENTS

| | | |
|---|---|---|
| 2,641,324 | Fortescue | June 9, 1953 |
| 2,644,534 | Jensen | July 7, 1953 |
| 2,811,212 | Sikorsky | Oct. 29, 1957 |